Patented Mar. 16, 1948

2,437,858

UNITED STATES PATENT OFFICE 2,437,858

PROCESS FOR TREATING DIACETONE SORBOSE AND MONOACETONE SORBOSE

John F. Mahoney, Westfield, and Henry H. Bassford, Jr., Garwood, N. J., assignors to Merck & Co., Inc., Rahway, N. J., a corporation of New Jersey No Drawing. Application September 30, 1944, Serial No. 556,674

8 Claims. (Cl. 260—338)

This invention relates generally to improvements in a process for producing laevo-ascorbic acid (vitamin C) and particularly to improvements in a process for producing diacetone laevo-sorbose, an intermediate useful in the synthesis of laevo-ascorbic acid. According to one process of manufacture laevo-ascorbic acid is obtained by oxidation of diacetone laevo-sorbose followed by molecular rearrangement.

In the production of diacetone laevo-sorbose (hereinafter referred to as diacetone sorbose) according to one prior art process laevo-sorbose is actetonated in the presence of sulfuric acid and the reaction mixture is thereafter neutralized with an alkaline agent under essentially anhydrous conditions, the salt formed during neutralization being removed by filtration. This method of neutralization results in liberation of water which hydrolyzes a part of the diacetone sorbose, and unless a drying agent is present in the reaction mixture, a large portion of the diacetone sorbose is decomposed. The presence of a drying agent, however, tends to inhibit the neutralization reaction until a considerable excess amount of alkali has been added, whereupon a rapid neutralization results with an undesirable sudden increase in temperature.

The large amount of drying agent normally employed, as well as the salt formed during neutralization, must be removed by filtration. Washing this material free of diacetone sorbose requires large amounts of acetone, considerable quantities of which are lost mechanically and by vaporization with resulting increase in the unit cost of the operation.

An object of this invention is to provide a novel process for preparing diacetone sorbose wherein the neutralization of the acetonation mixture containing diacetone sorbose and monoacetone sorbose occurs in mildly alkaline aqueous solution without decomposition of the sorbose compounds, followed by separation of an acetone solution of the sorbose compounds. This solution is treated to obtain substantially pure diacetone sorbose.

Regarded in certain of its broader aspects, the novel process according to this invention comprises adding an acidic acetonation product containing monoacetone sorbose and diacetone sorbose to an alkaline aqueous solution, the concentration of alkali in said solution being more than sufficient to neutralize acidic components of the added mixture, and water being present in a quantity merely sufficient to dissolve any salt present; stratifying the resulting mixture into a layer consisting predominantly of acetone and acetone-soluble components, and a layer consisting predominantly of aqueous saline solution; and separating the said stratified layers to recover the acetone layer containing substantially all of the monoacetone sorbose and diacetone sorbose.

Diacetone sorbose is obtained from the acetone layer by removing the acetone and extracting with organic solvent in accordance with a new process fully described in a companion application by W. R. Graff and W. S. Harmon, filed concurrently herewith, Serial No. 556,676, filed September 30, 1944.

In the acetonation of laevo-sorbose, monoacetone sorbose, or mixtures thereof, according to known methods, an acidic acetonation product is obtained which comprises an acetone solution containing approximately 14% diacetone sorbose, 5% monoacetone sorbose, 10% of a mineral acid such as sulfuric acid and traces of water and acetone polymers. This product is a typical starting material used in practicing the process according to this invention.

In the present process the neutralization of such an acidic acetonation product has been made practically an instantaneous reaction as contrasted with previously known methods by carrying out the reaction in aqueous solution. While diacetone sorbose hydrolyzes readily in aqueous acid solution, it has been found that it is relatively stable in mildly alkaline aqueous solution. By employing an aqueous solution of an alkaline agent such as aqueous ammonia, sodium carbonate, potassium carbonate, sodium hydroxide, potassium hydroxide, and the like, and adding the acid acetonation solution to the vigorously agitated alkaline solution, the acid of the acetonation solution is completely neutralized before any appreciable hydrolysis of the diacetone sorbose occurs. Temperatures up to the boiling point of acetone may be employed but above about 35° C. there is a tendency for diacetone sorbose to decompose, and above about 15° C. increased amounts of polymeric materials are formed; accordingly it is preferred to conduct the reaction at or below room temperature. When neutralization is complete the diacetone sorbose is quite stable in aqueous solution even at temperatures of about 100° C.

It is discovered, according to the present invention, that if sufficient water is added to the neutralized slurry, or if sufficient water is added during neutralization to just dissolve the salt which is formed, there is a separation or salting out of an upper layer comprising an acetone solution of mono and diacetone sorbose, water, and some salt. The lower layer thus formed, comprising a water solution of the salt, contains practically no acetone and only a trace of the sugar products. This is surprising in view of the high solubility of mono- and diacetone sorbose in water. One extraction of the lower layer with a small amount of acetone removes all of the acetonated sugar that may be in the emulsion at the interface.

The amount of water in the acetone layer if the lower layer is saturated, for example, with ammonium sulfate at 15° C. will be about 30%. It has been found, however, that the water content of the acetone layer can be lowered to 10–15% by adding, during neutralization or to the neutralized batch, a small amount of one or more water soluble salts different from the salt formed by the neutralization reaction, and raising the temperature to 40–45° C. during the salting out process. By controlling the amount of salt added the amount of water retained in the acetone layer can be held within the range most suitable for the further treatment of the acetone layer to separate diacetone sorbose.

By way of example the neutralization is effected by charging 34 parts by weight of ammonia water (29% by weight ammonia) to a neutralizer together with 40 parts of water or ice and lowering the temperature to 0° C. The cooled solution is agitated and 140 parts of an acetonation product having the approximate composition above described is fed to the neutralizer preferably in a fine spray and at such a rate that the temperature is maintained below 15° C. and preferably about 10° C. When neutralization is complete, the batch is heated to about 40° C. and 3 parts of anhydrous sodium sulfate is added. The agitation is stopped and the mixture is allowed to stand for one hour during which time there is a separation or salting out of an acetone layer from a water layer comprising a saturated solution of ammonium sulfate and sodium sulfate. The water layer and the emulsion formed at the interface are passed to a separator and the clear acetone layer is pumped to a storage tank. The water layer and emulsion in the separator is extracted once with about 20 parts of acetone, water being also added if necessary to dissolve precipitated inorganic salt. The extracted water layer is dropped to the sewer and the acetone layer is added to the batch in the storage tank. The acetone layer comprises an acetone solution of diacetone sorbose and monoacetone sorbose together with 10–15% of water and small amounts of ammonia, acetone polymers, and inorganic salts.

While the process has been described with reference to the use of ammonia as the neutralizing agent for the acidic acetonation product, it will be apparent that the process as described applies equally to the use of other alkaline agents previously enumerated. Likewise, the water soluble salt differing from that formed during neutralization and added to control the amount of water remaining in the acetone layer can be sodium chloride, sodium sulfate, ammonium sulfate and the like.

Modifications may be made in carrying out the present invention without departing from the spirit and scope thereof, and the invention is to be limited only by the appended claims.

What is claimed is:

1. In a process for producing diacetone sorbose the step that comprises neutralizing an acidic mixture containing acetone, monoacetone sorbose, and diacetone sorbose by adding said mixture with agitation to an aqueous alkaline solution, the amount of water present being merely sufficient to dissolve substantially all of the salt formed during neutralization, separating the salt formed during neutralization from the neutralized mixture as a saturated aqueous solution, and recovering an acetone solution immiscible with said saturated aqueous solution and containing substantially all of the monoacetone sorbose and diacetone sorbose and a small amount of water.

2. The process that comprises adding a mixture containing acetone, monoacetone sorbose, diacetone sorbose and sulfuric acid to an aqueous ammonia solution, the concentration of ammonia in said solution being more than sufficient to neutralize acidic components of the added mixture, and water being present in a quantity merely sufficient to dissolve substantially all of the salt present after neutralization, stratifying the resulting mixture into a first layer composed predominantly of acetone and acetone-soluble components and containing substantially all of the mono-acetone sorbose and diacetone sorbose, and a second layer composed predominantly of aqueous saline solution, controlling the amount of water retained in said first layer by adding sodium sulfate to said mixture prior to stratification and maintaining a temperature of about 40–45° C. during said stratification, and recovering said first layer.

3. The process that comprises adding an acidic mixture containing acetone, monoacetone sorbose, and diacetone sorbose to an aqueous solution of an alkaline substance and a water soluble salt different from the salt formed by the reaction of the acidic components of the added mixture with said alkaline substance, the amount of said alkaline substance being more than sufficient to neutralize said acidic components, and water being present in a quantity merely sufficient to dissolve substantially all of the salt present after neutralization, stratifying the resulting mixture into a first layer composed predominantly of acetone, acetone-soluble components and a small amount of water, and a second layer composed predominantly of aqueous saline solution, and recovering said first layer.

4. The process that comprises adding a mixture containing acetone, monoacetone sorbose, diacetone sorbose and sulfuric acid to an aqueous solution containing ammonia and sodium sulfate, the concentration of ammonia in said solution being more than sufficient to neutralize acidic components of the added mixture, and water being present in a quantity merely sufficient to dissolve substantially all of the salt present after neutralization, heating the neutralized mixture to about 40–45° C. and stratifying the resulting mixture into a first layer composed predominantly of acetone and acetone-soluble components and containing substantially all of the monoacetone sorbose and diacetone sorbose, and less than about 15% water, and a second layer composed predominantly of aqueous saline solution, and recovering said first layer.

5. The process that comprises adding an acidic mixture containing acetone, monoacetone sorbose and diacetone sorbose to an alkaline aqueous solution, the concentration of alkali in said solution being more than sufficient to neutralize acidic components of the added mixture, and water being present in a quantity merely sufficient to dissolve any salt present, stratifying the resulting mixture into a first layer composed predominantly of acetone and acetone-soluble components, and a second layer composed predominantly of aqueous saline solution, and recovering said first layer.

6. The process that comprises adding an acidic mixture containing acetone, monoacetone sorbose and diacetone sorbose to an alkaline aqueous solution, the concentration of alkali in said solution being more than sufficient to neutralize acidic components of the added mixture, and water being present in a quantity merely sufficient to dissolve any salt present, stratifying the resulting mixture into a first layer composed predominantly of acetone and acetone-soluble components, and a second layer composed predominantly of aqueous saline solution, controlling the amount of water retained in said first layer by adding to said mixture prior to stratification a water soluble salt different from the salt formed during neutralization, and recovering said first layer.

7. The process that comprises adding an acidic mixture containing acetone, monoacetone sorbose and diacetone sorbose to an alkaline aqueous solution, the concentration of alkali in said solution being more than sufficient to neutralize acidic components of the added mixture, and water being present in a quantity merely sufficient to dissolve any salt present, salting out an upper layer composed predominantly of acetone and acetone-soluble components while forming a lower layer composed predominantly of aqueous saline solution, and recovering said upper layer.

8. The process that comprises adding a mixture containing acetone, monoacetone sorbose, diacetone sorbose and sulfuric acid to an aqueous ammonia solution, the concentration of ammonia in said solution being more than sufficient to neutralize acidic components of the added mixture, and water being present in a quantity merely sufficient to dissolve substantially all of the salt present after neutralization, stratifying the resulting mixture into a first layer composed predominately of acetone and acetone-soluble components and containing substantially all of the monoacetone sorbose and diacetone sorbose, and a second layer composed predominately of aqueous ammonium sulfate solution, and recovering said first layer.

JOHN F. MAHONEY.
HENRY H. BASSFORD, Jr.

REFERENCES CITED

The following references are of record in the file of this patent:

UNITED STATES PATENTS

| Number | Name | Date |
|---|---|---|
| 2,301,811 | Reichstein | Nov. 10, 1942 |